Nov. 21, 1950 K. R. BELCH 2,531,248
POSITION FINDER
Filed June 22, 1948
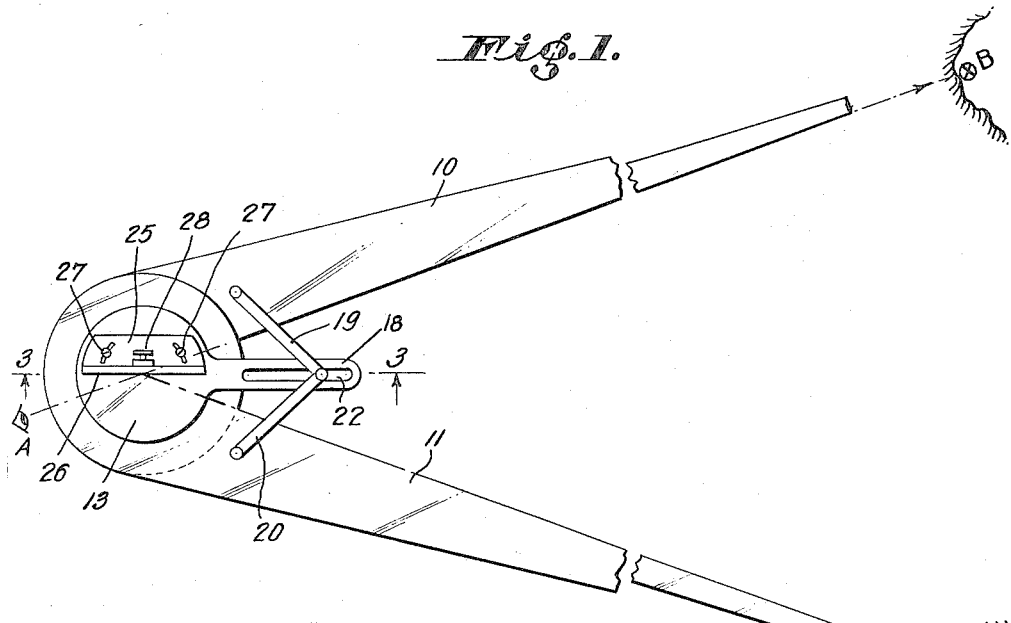
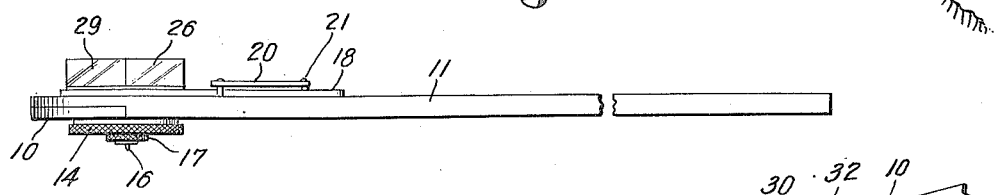
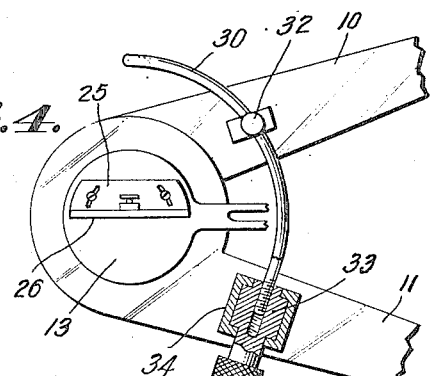
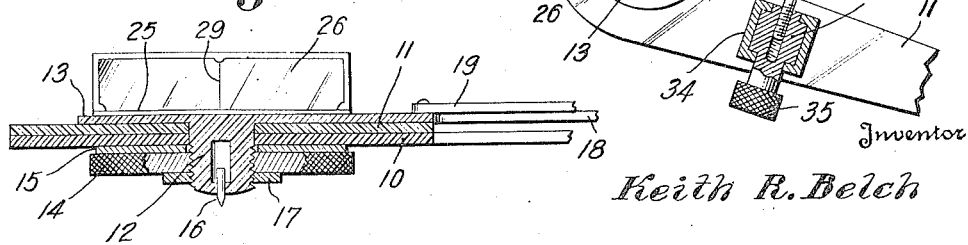
Inventor
Keith R. Belch
By Donald E. Lane
Attorney.

Patented Nov. 21, 1950

2,531,248

UNITED STATES PATENT OFFICE 2,531,248

POSITION FINDER

Keith Rogers Belch, Annapolis, Md., assignor to Weems Navigation, Inc., Washington, D. C.

Application June 22, 1948, Serial No. 34,430

2 Claims. (Cl. 33—67)

This invention relates to position finding devices and more particularly to a combined sighting and plotting instrument especially useful in coastwise navigation of small ships and boats.

Position finding devices for taking sights on two or more landmarks are known as disclosed, for example, in the patents issued to Von Opel, Patent No. 2,328,517, dated August 31, 1943, to Raymond, Patent No. 1,050,393, dated January 14, 1913, and to Clark, Patent No. 807,153, dated December 12, 1905. In using these prior art devices, it is difficult to make accurate sightings on two landmarks simultaneously since the observer's eye must be shifted from one line of sight to another line of sight while holding or supporting the device properly alined with the first landmark. While the Von Opel device is adapted to be used in plotting, its use requires knowledge of the compass course or lubber line of the ship.

It is an object of this invention to provide a combined sighting and plotting instrument which is readily portable and which does not require a fixed support during sighting.

It is another object of this invention to provide a position finding device which does not require the observer to shift his line of vision while taking simultaneous sights on two landmarks.

It is another object of this invention to provide a position finding device which may be held in the hand during the taking of sights and which may then be applied directly to a chart to quickly develop a curved line of position thereon.

It is another object of this invention to provide a sighting and plotting instrument which in use does not require knowledge of the compass course or knowledge of the lubbers line of the ship.

It is a still further object of this invention to provide a combined sighting and plotting instrument which may be carried in one's pocket and which is economical to manufacture.

Other objects and advantages of this invention will be readily apparent to those skilled in the art from the following description of a preferred embodiment illustrated in accompanying drawings, wherein:

Figure 1 is a plan view partly cut away, showing the position finding device diagrammatically alined with two landmarks.

Figure 2 is an elevation view of the position finding device shown in Figure 1.

Figure 3 is an enlarged vertical sectional view taken on line 3—3 of Figure 1, showing details of that portion of the device adjacent the pivotal connection of the two arms.

Figure 4 is an enlarged plan view of the pivotal portion of a modified form of the device provided with supplementary adjusting means.

Referring to the drawings, for purposes of illustration, the preferred embodiment of this invention comprises two arms designated by the numerals 10 and 11 which are pivotally connected by a bushing 12. The inner edges of the arms 10 and 11 are straight and are in line with the axis of the connecting bushing 12. The bushing 12 is provided on its upper end with a disc 13 which engages the inner end of arm 11, and the threaded lower end of bushing 12 is provided with a clamping nut 14 which engages a washer 15 against the under side of the inner end of arm 10. A marking pencil or lead 16 is secured in the lower end of bushing 12 by a clamping nut 17 with the marking point on the vertical axis of the bushing.

The disc 13 is provided with a slotted projecting finger 18. A pair of links 19 and 20 extend from the arms 10 and 11 to a sliding pivot 21 arranged in the slot 22 of finger 18. The links 19 and 20 are of equal length and are pivotally connected to the arms 10 and 11 at points equidistant from the axis of bushing 12 and equidistant from the inner straight edges of said arms. This arrangement of linkages provides that the longitudinal axis of finger 18 always bisects the angle between the inner straight edges of arms 10 and 11. Adjustably secured to the upper surface of disc 13 is a plate 25 supporting a vertical mirror 26. The plate 25 is secured to the disc 13 by screws 27 passing through slots in the plate whereby the plate 25 may be adjusted in position on disc 13 with the mirror 26 aligned with the axis of bushing 12. An adjusting screw 28 may also be provided to permit a tilting adjustment of the mirror 26 to secure correct alinement with the pivotal axis of bushing 12. The mirror may be provided with a line 29 marked thereon also alined with the pivotal axis. The inner edges of the sighting arms 10 and 11 are straight so as to engage each other when the arms are closed together and so as to intersect the pivotal axis of bushing 12 at all times. Where desired, the outer ends of the arms 10 and 11 may be provided with removable extensions, as is well known in the art.

In the modified construction illustrated in Figure 4, an adjusting means is provided for close adjustment of the angle between sighting arms 10 and 11 during sighting. The adjusting means may comprise a curved arm 30 passing through a suitable clamp 31 secured on arm 10, the clamp 31 having a thumb screw 32 engageable with the arm 30. The end of the arm 30 adjacent the arm 11 is threaded for engagement with a threaded bushing 33, the latter being mounted in a small bracket 34 secured to the arm 11. The bushing 33 is provided with a projecting knob 35 adapted to be turned by the operator's thumb and finger. During sighting, the thumb screw 32 may be released for rough adjustment of the device, and may then be turned down on the arm 30, close adjustment then being made by the knob 35. It will be obvious that various other equivalent adjustment mechanisms may be substituted for that shown in Figure 4.

The method of operation and use of the combined sighting and plotting device will now be described. The device may be held in the operator's hand with the arms 10 and 11 in a horizontal plane. The operator sights with his eye A along the inner straight edge of arm 10 to a known charted landmark B. While maintaining the arm 10 alined with landmark B, he moves the arm 11 until his eye A sights the second charted landmark C on line 29 in mirror 26 aligned along the inner straight edge of arm 11. It is not necessary for the operator to change his line of vision during sighting since the mounting of the mirror 26 and the linkages 19 and 20 cause the mirror to always bisect the angle between the two sighting edges and therefore reflect the image sighted along arm 11 to the line of sight along arm 10. Thus one landmark B is sighted over the top of mirror 26 and along arm 10 as the other landmark C is sighted in the mirror 26 along the same line of vision. After the two landmarks are roughly sighted, the clamping screw 32 may be locked against the arm 30 and a precise adjustment may then be made by turning knob 35 in the proper direction. When using devices without the supplemental adjusting means shown in Figure 4, the operator may tighten the clamping nut 14 to lock the device in the sighted angular position.

The device is then laid on a chart bearing the two landmarks B and C. A pair of dividers are placed on the chart with one point on landmark B and the other point on the landmark C. The device is moved against the dividers so that one point engages the inner straight edge of arm 10 and the other point engages the inner straight edge of arm 11. The device is then moved over the chart with the arm edges always in contact with the divider points. A curved line of position will then be marked on the chart by the marking point 16. Every point on the line so inscribed will thus make an angle with the two landmarks B and C equal to the sighting angle between the sighting edges of arms 10 and 11. Having then a curved line of position, the operator will then make a second sight on another pair of known landmarks and inscribe a second curved line of position on the chart. The intersection of the two curved lines of position designates the position or fix of the observer. Where there is a substantial time interval between sightings, the curved line of position from the first position may be run forward equal to the distance run, as in conventional navigation to provide an accurate fix when the second sight is plotted. Ordinarily the sightings may be taken and plotted quickly in a very short interval of time and the distance run between sightings will be negligible. The landmarks sighted upon should be chosen so as to avoid the plotting of small angles, and landmarks which subtend an observer's angle of the order of thirty to ninety degrees are preferable. Where the two curved lines of position are found to intersect twice, it will be readily apparent to the skilled operator which is the proper position fix, or else further sights may be easily and quickly made and plotted to check the proper position.

The combined sighting and plotting device may be conveniently made from transparent plastic material. The device may be made small enough to carry in one's pocket, and if extensions for the arms 10 and 11 are desired, such extensions may be pivoted to or slideable on the arms or may be removable therefrom, as is known, particularly with the conventional three-arm station plotter. The combined sighting and plotting device described herein may be economically made particularly since no angular markings or scales are necessary.

The device may also be used to set a course from a known position or fix and a charted landmark by placing the device on a chart with edge of one arm on a line between the known position and the landmark, adjusting the other arm to the desired course, and then sighting the landmark along one edge and altering the course of the ship or boat until its course is alined with the edge of the other arm. The course may be set in this manner without reference to a compass. The device may also be used to get a bow and beam bearing, and other uses will suggest themselves to those familiar with navigation.

The device is easily adjusted in proper alinement by separating the arms 10 and 11 to an angle of the order of thirty to ninety degrees, adjusting the position of mirror 26 by screws 27 until the reflected image of the straight edge of arm 11 is coincident with the real image of the straight inner edge of arm 10 as seen over the line 29 of mirror 26. The plane of mirror 26 is then bisecting the angle between the inner edges of arms 10 and 11. With the arms separated, the mirror surface 26 may be adjusted to be perpendicular to the horizontal plane containing the sighting edges by adjusting screw 28 to bring the reflected image of the outer end of arm 11 into coincidence with the real image of the outer end of arm 10 as seen over the line 29 of mirror 26.

It is obvious that many variations in design and attachments to the sighting and plotting device described herein will be readily apparent to those skilled in the art, and this invention contemplates any equivalent structures within the scope of the following claims.

I claim:

1. A sighting and plotting instrument for use in charting a position, comprising in combination, a pair of tapered sighting arms of thin flat material, each arm having a straight sighting edge, the end portion of one arm overlapping an end portion of the other arm, a bushing extending through said end portions, a head on said bushing engaging the surface of one of said arms, a flat reflector supported by said head closely adjacent and perpendicular to the plane of the sighting edges of said arms, and linkage connecting said head to said arms for maintaining said reflector in a plane bisecting the angle between said sighting edges, said bushing having an axial recess therein aligned with the intersection of extensions of the lines of said sighting edges to receive a marking point.

2. A sighting and plotting instrument for use in charting a position comprising in combination, a pair of sighting arms of thin sheet material, each arm having a straight sighting edge, a bushing extending through each of said arms with its axis in alignment with the sighting edge of each arm, said bushing having a head engaging the upper surface of one of said arms, a flat reflector of small vertical height supported by said head closely adjacent and perpendicular to the plane of the sighting edges of said arms, said reflectors have a sighting line thereon aligned with the axis of said bushing, connecting means extending between said head and said arms for maintaining said reflector in a plane bisecting the angle between said sighting edges, and clamping means to secure said arms in adjusted position, said bushing having an axial recess therein to receive a marking point for marking a curved line of position.

KEITH ROGERS BELCH.

REFERENCES CITED

The following references are of record in the file of this patent:

UNITED STATES PATENTS

| Number | Name | Date |
| --- | --- | --- |
| 1,877,459 | Hayes | Sept. 13, 1941 |

FOREIGN PATENTS

| Number | Country | Date |
| --- | --- | --- |
| 779,474 | France | Jan. 14, 1935 |